US012540613B2

(12) United States Patent
Morsch et al.

(10) Patent No.: US 12,540,613 B2
(45) Date of Patent: Feb. 3, 2026

(54) TEST DEVICE

(71) Applicant: HYDAC FLUIDTECHNIK GMBH, Sulzbach/Saar (DE)

(72) Inventors: Joachim Morsch, Marpingen (DE); Wolfgang Hahmann, Kempen (DE); Gerd Schneider, Dillingen (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 250 days.

(21) Appl. No.: 18/028,668

(22) PCT Filed: Nov. 15, 2021

(86) PCT No.: PCT/EP2021/081734
§ 371 (c)(1),
(2) Date: Mar. 27, 2023

(87) PCT Pub. No.: WO2022/106369
PCT Pub. Date: May 27, 2022

(65) Prior Publication Data
US 2024/0011478 A1 Jan. 11, 2024

(30) Foreign Application Priority Data
Nov. 19, 2020 (DE) .............. 10 2020 007 053.1

(51) Int. Cl.
*F04B 51/00* (2006.01)
*F04B 49/06* (2006.01)

(52) U.S. Cl.
CPC ............ *F04B 51/00* (2013.01); *F04B 49/065* (2013.01)

(58) Field of Classification Search
CPC ..... F04B 51/00; F04B 49/065; F04C 2270/80
See application file for complete search history.

(56) References Cited

U.S. PATENT DOCUMENTS 2,720,782 A * 10/1955 Stein .................... F02M 65/002
73/114.77
2005/0111988 A1 5/2005 Griffiths
(Continued)

FOREIGN PATENT DOCUMENTS

DE         197 03 891        7/2008
DE    10 2008 005 988        7/2009
(Continued)

OTHER PUBLICATIONS

International Search Report (ISR) issued Jan. 25, 2022 in International (PCT) Application No. PCT/EP2021/081734.

*Primary Examiner* — David J Bolduc
(74) *Attorney, Agent, or Firm* — Wenderoth, Lind & Ponack, L.L.P.

(57) ABSTRACT

A fluidic pump test device includes a fluidic pump, a pressure influencing device, and an evaluation device. The fluidic pump is configured to be driven by a drive device. The fluidic pump is configured such that a rotational speed of the fluidic pump, which leads to a fluid volumetric flow on an output side of the fluidic pump, is known. The pressure influencing device is configured to: (i) conduct, at least temporarily, the fluid volumetric flow; and (ii) during operation of the fluidic pump, bring about a pressure drop. The evaluation device is configured to, based on a decrease of the pressure drop, determine a reduction in a functional capability of the fluidic pump.

13 Claims, 2 Drawing Sheets

(56) References Cited

U.S. PATENT DOCUMENTS

| | | | |
|---|---|---|---|
| 2009/0188309 A1 | 7/2009 | Hartimath et al. | |
| 2010/0114455 A1 | 5/2010 | Karlsson et al. | |
| 2013/0323088 A1* | 12/2013 | Medow | F15B 19/005 |
| | | | 417/63 |
| 2020/0040889 A1* | 2/2020 | Smith | G01N 11/00 |
| 2023/0125840 A1* | 4/2023 | Rutar | F04B 1/295 |
| | | | 417/218 |
| 2023/0151806 A1* | 5/2023 | Pozzo | F04B 1/324 |
| | | | 60/452 |
| 2023/0174222 A1* | 6/2023 | Hagihara | B64C 25/28 |
| | | | 244/102 A |

FOREIGN PATENT DOCUMENTS

| | | |
|---|---|---|
| DE | 10 2008 043 469 | 5/2010 |
| DE | 103 43 457 | 1/2012 |
| DE | 10 2011 078 870 | 7/2012 |
| DE | 10 2011 075 870 | 11/2012 |
| DE | 10 2015 007 059 | 12/2016 |
| DE | 10 2019 000 212 | 7/2020 |
| EP | 1 522 731 | 4/2005 |

* cited by examiner

TEST DEVICE

BACKGROUND OF THE INVENTION

1. Field of the Invention

The invention relates to a test device for a fluidic pump device, which can be driven by a drive device and of which the pump rotational speed that leads to a defined fluid volumetric flow on the output side of the pump device is known.

2. Description of the Related Art

A fluidic pump device, technically also known as a hydraulic pump, is a device for converting mechanical energy into hydraulic energy. For this purpose, displacement pumps based on different displacement principles, such as gear pumps, vane pumps or piston pumps, are regularly used in hydrostatics. Moreover, such pump devices provide constant or variable delivery volumes or volume flows.

Fluidic pump devices are used in almost any hydraulic system, in which a fluid volume flow is to be transported from a low-pressure supply source, such as a tank, to a hydraulic load, such as a power cylinder, at a presettable pressure. For instance, DE 10 2019 000 212 A1 shows a circuit arrangement for the load-pressure-optimized lowering of loads by means of a fluidically drivable working device, in particular in the form of at least one hydraulic power cylinder, which can be supplied with a fluid of predeterminable pressure by a motor-pump unit in the inlet for lifting the relevant load, and having a return line for discharging fluid from the working device when lowering this load, in which return line a proportional valve is installed, which performs a dual function in that it is used as a proportional valve when lifting and lowering the load by means of the hydraulic working device and as a pressure relief valve.

It is understandable that in such and similar applications, increased safety requirements are placed on the operation of hydraulic systems, wherein valves, as a rule installed in hydraulic circuits, predominantly provide the relevant safety functionality. In addition, of course, it is desired that the other parts of the hydraulic circuit that are subject to wear, such as a fluidic pump device or hydraulic pump, can be replaced or repaired using an appropriate new element before any failure occurs, to guarantee the functional reliability of the overall system in any case. In this case, replacement or repair should be performed in time to avoid sudden failure of the hydraulic system during operation.

To ensure this, test devices have already been proposed in the prior art, for instance a device for particle measurement according to DE 103 43 457 C5 having a particle counter in the form of a sensor operating on the basis of optical measuring methods, which responds to the presence of particles in a measuring zone, through which a fluid flow of a viscous medium or hydraulic medium passes and in that way generates evaluable sensor signals. In this known solution, a section of pipe of predeterminable length is arranged on the inflow end of the sensor as a flow-calming section in such a way that gases entrained in the fluid can re-dissolve in the fluid to prevent the sensor from detecting the gas or air entrainment as harmful particle contamination for the fluid. In any case, such a test device detects when the number of particles in the fluid increases significantly compared to normal operation, which can be an indirect indication, for instance, that the fluidic pump device is failing and that increasingly metallic particles from the pump device are entering the fluid circuit due to abrasion. Such a signal can then result in the shutdown of the system and, if necessary, after appropriate testing, to the replacement of worn components, such as the hydraulic pump. The basic design of such a particle counter consists of a light source, a measuring cell, through which the particles to be measured move, and a so-called detection unit. Depending on the size of the particles, a signal of varying strength can be measured, wherein, as explained above, any gas or air bubbles trapped in the fluid can be falsely detected as particles and thus constitute a possible source of error.

SUMMARY OF THE INVENTION

Based on this state of the art, the invention addresses the task of creating a test device alternative to optical methods, which is cost-effective and functionally reliable in use. The test device described herein solves this problem.

Since the fluid volumetric flow is conducted at least temporarily via a pressure influencing device which, during operation of the pump device, brings about a pressure drop, by way of the decrease of which an evaluation device makes a statement about a reduced functional capability of the pump device possible, it is possible to determine, without the use of optically complex testing and measuring procedures, whether a pressure supply device generally in the form of the pump device or hydraulic pump is still functional, i.e. whether it actually provides the pump performance expected and specified, in particular whether the pump device still provides the required performance during correspondingly long operation or is worn to such a degree that a repair or, if necessary, a replacement of the pump device is necessary.

In any case, the test device according to the invention renders counteracting any failure of a hydraulic circuit possible by replacing the pump device without causing consequential damage to the hydraulic circuit and the connected loads. The test device according to the invention does not require any optical components and can be implemented by a simple design using standard mechanical and electronic components. This is without parallel in the prior art. All in all, a smart condition monitoring sensor system for hydraulic pumps has been implemented in this way, wherein pump equipment already supplied can also be retrofitted with the test device.

Since the manufacturer knows the speed of the pump device, which results in a defined volume flow, it is possible that during operation, in the event of an unintentionally lower pressure drop compared to an earlier, higher pressure drop at the aforementioned pressure-influencing device, the evaluation unit recognizes this as a delivery loss of the pump device and thus as an impairment of its functionality. The volumetric efficiencies of the pumps in question here have a variance of several percent when new. Therefore, it is usually necessary to program the new condition of the pump individually, i.e. when the pump is started up, the orifice plate, i.e. the pressure-influencing device, is used to determine the pressure difference or the pressure difference map. If this pressure difference drops by more than a presettable value during operation, for instance by more than 10% from the programmed value, this is indicated. In this respect, it is therefore preferable for the evaluation unit not to assess the functional capability on the basis of predefined pressure difference values, but to recognize and store pressure difference values measured in the new state, e.g. during commissioning, as good and, if the pressure difference values measured during operation fall below these programmed values to below a predefinable pressure threshold value, to recognize the pump device as poor or functionally restricted or incapable, which makes it necessary to replace or repair the pump device. Since the pump device with a predefinable power volume is always used for defined hydraulic recirculation systems in conjunction with their loads, empirical values for permissible threshold values, below which the measured values should not drop, are available or can be obtained in pilot operation in connection with such hydraulic systems.

In a preferred embodiment of the test device according to the invention, provision is made for the pressure-influencing device to have an orifice plate and for the evaluation device to have a pressure sensor. In addition to an orifice plate as a pressure-influencing device, a valve device can also be installed between the pump device in the by-pass branch to a low-pressure end or tank end of the hydraulic circuit, the operation of which inevitably results in a pressure drop, albeit a small one, which can be used to measure pressure, wherein the pressure sensor for recording pressure values is installed in the fluid connection between the pump device and this valve device.

The pressure values detected by means of the pressure sensor are preferably forwarded to a microcontroller as part of the evaluation device, wherein an interface to a machine that can be fluidically driven, such as a machine tool, is created by means of a communication device, preferably in the form of an IO-Link interface, which receives a signal via the microcontroller upon a decrease of the functional capability of the pump device. The machine control system can process any resulting signals, wherein a status message in the form of a traffic light display is feasible, where the color green stands for a fully functional pump and red suggests a replacement or repair of the pump device. An amber display in the context of the traffic light can, in the sense of a warning function, indicate to a machine operator to expect significant wear of the pump equipment in the near future.

In a preferred embodiment of the test device according to the invention, provision is made for the latter to be operated only in by-pass mode, i.e., a test measurement or test of the pump device is performed in a by-pass branch when the main function of the hydraulic loads is switched off. In so doing, the preferred embodiment is for this shutdown of the main function to be signaled to the test device via the interface, in that way activating the test. Basically, however, it is also possible to use the pump device to supply the hydraulic circuit at the same time and in so doing perform the test measurement for the suitability of the pump device.

While the measurement is performed, there is no volume flow available for the function of the plant. Therefore, an enable signal from the plant is required to perform the measurement. A suitable interface can be used to transmit this signal. Alternatively, there is the option of the system trying to determine suitable times for the measurement autonomously. This can be based, for instance, on the analysis of work cycles.

The test device can be implemented using simple valve components, wherein for very high operating pressures and volume flows provision may be made for using several control valves, of which one control valve is a so-called logic valve. The test device can be used continuously during or after the hydraulic function is switched off; however, it is also possible to initiate at least one test step in the outlined framework at larger discrete time intervals, for instance every fortnight or once a month.

BRIEF DESCRIPTION OF THE DRAWINGS

The test device according to the invention will be described in greater detail by way of two exemplary embodiments shown in the drawings. In a schematic representation and not to scale, in the manner of hydraulic circuit diagrams.

DETAILED DESCRIPTION OF THE INVENTION

Figure 1:
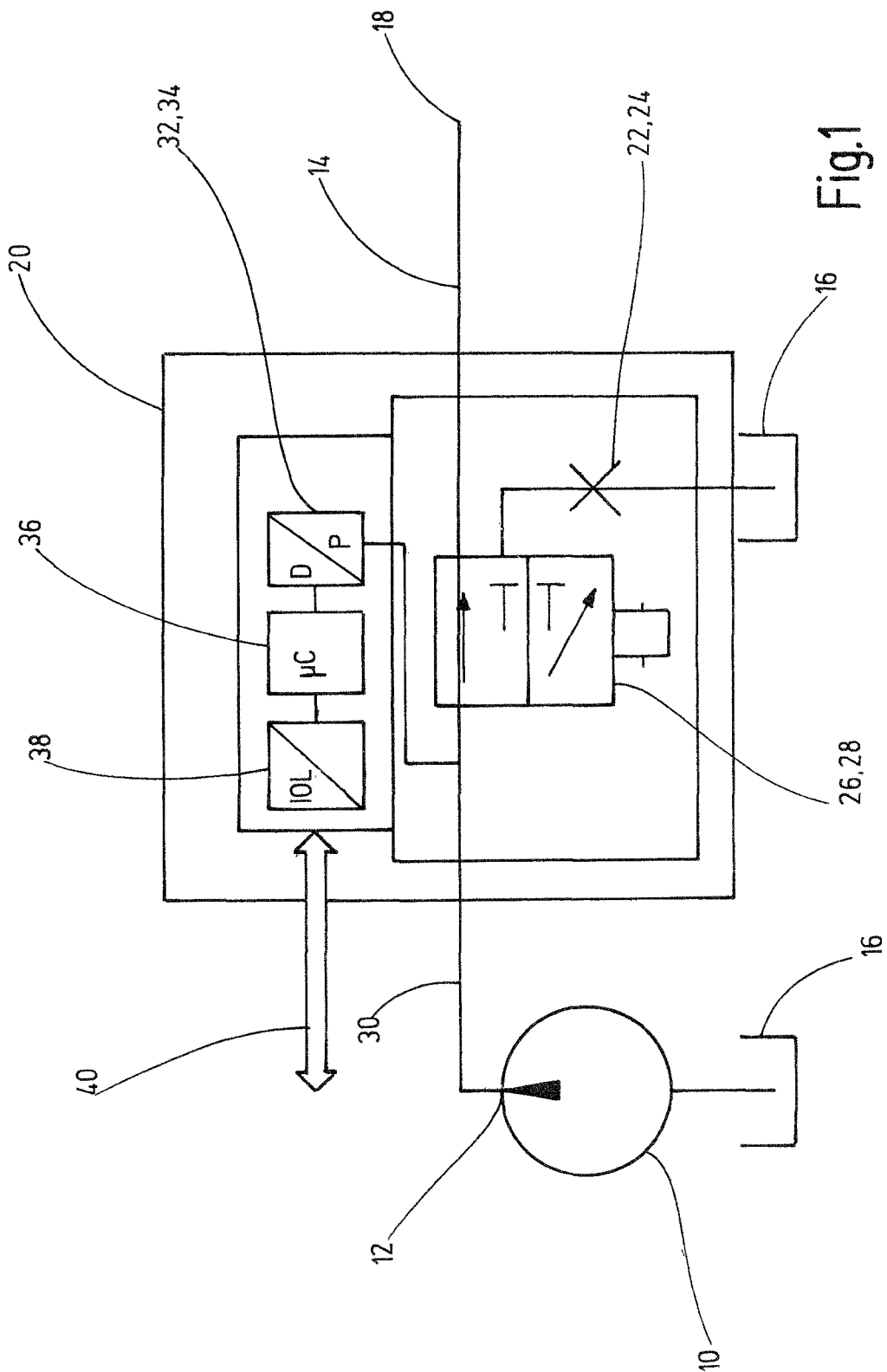
FIG. 1 shows a first exemplary embodiment of the test device according to the invention.

The test device shown in FIG. 1 is connected to a fluidic pump device 10. The pump device 10 is a conventional hydraulic pump based on the positive displacement principle, the possible delivery volume of which can be preset. In this respect, the pump can be a fixed displacement pump or a variable displacement pump. In this respect, the pump speed of the pump device 10 is known, which results in a defined fluid volume flow at the delivery end 12 of the pump device 10. The pump device 10, which can be driven by a drive device such as a motor (not shown), regularly draws the fluid in the form of a hydraulic medium from the low-pressure end of a hydraulic recirculation system 14, which is only partially shown in FIG. 1, wherein in this case the fluid is drawn from a tank 16 in the usual manner. Hydraulic loads, such as hydraulic power cylinders, are connected to the load end 18 of the hydraulic recirculation system 14 in the usual manner and therefore not described any further here.

The test device as a whole is installed between the pump device 10 and the load end 18, which is outlined in a block diagram 20. There, the test device has a pressure-influencing device 22 in the form of a constant orifice 24. The choice of orifice depends on the flow rate and the orifice is selected such that the pressure is preferably in the range of more than 50 percent of the maximum pump pressure. In addition to using a constant aperture 24, a variable aperture is also an option; however, it has to be lockable in the measuring position. At the outlet end, the pressure-influencing device 22 or the orifice plate 24 is connected to the low-pressure end of the hydraulic recirculation system 14 and in this respect again opens out into the tank 16 or into a further tank. The input end of the pressure-influencing device 22 is routed to the output of a valve device 26, which in this case is designed as a 3/2-way solenoid valve 28. In the switching position of the valve device 26 shown in FIG. 1, the hydraulic loads of the recirculation system 14 connected to the load end 18 are connected in a fluid-conveying or media-conveying manner to the pressure-supplying outlet of the pump device 10. If the valve device 26 is switched, the fluid supply to the load end 18 is cut off and the pressure-influencing device 22 in the form of the orifice plate 24 is supplied with pressure medium from the pump device 10 in the by-pass branch.

An evaluation device 32 in the form of a pressure sensor 34 is installed in the supply line 30 between the pump device 10 and the valve device 26 as part of the recirculation system 14. The acquired measurement data of the pressure sensor 34 reach a microcontroller 36, which, as a computer, acquires these measurement data and, if necessary, further evaluates them, wherein the evaluation data are forwarded to a communication device 38, which, preferably in the form of an IO-Link interface (IOL), forms an interface to a fluidically drivable machine (not shown), the components of which are connected, at least in part and if it can be fluidically driven, to the load end 18 of the pressure recirculation system 14.

At discrete time intervals, after the valve device 26 has been used to switch off the hydraulic loads, the pressure drop is measured via the orifice plate 24 by means of the pressure sensor 34 and the data is evaluated accordingly by the microcontroller 36 and forwarded via the interface 40 to a further evaluation unit, for instance as part of a machine control system. Since the rotational speed of the pump device 10, which can be driven by means of the drive unit not shown in more detail, is known and thus also its volume flow on its delivery end 12, the pressure drop during the operation of the pump device 10 at the pressure-influencing device 22 is known, wherein a corresponding standard pressure drop corresponds to the new operating state of the pump device 10, which can either be determined during commissioning or specified. If lower pressure drop values then occur over the period of use of the pump device 10 during operation of the test device, the conclusion can be drawn that the pump device 10 is no longer fully functional. Because the range of the possible pressure drop when a new pump starts to function is known from experience, a nonfunctional pump device 10 can also be detected in this way right from the start.

Accordingly, the evaluation device 32 can also store pressure values resulting from experience with such hydraulic recirculation systems and record system values obtained in this way as "good values". If there is a drop beyond a presettable pressure threshold value during operation of the pump device 10, the evaluation device 32 can detect this as a "bad value" and indicate a malfunction of the pump device 10 to the operator of the machine system via the corresponding communication device 38, also within the scope of the traffic light display described above.

Below, a further exemplary embodiment of the test device according to the invention is explained in more detail on the basis of a second exemplary embodiment according to FIG. 2. The components corresponding to the exemplary embodiment of FIG. 1 are displayed having the same reference numerals and the explanations given so far also apply to the embodiment of FIG. 2.

The test device according to FIG. 2 again has a pump device 10, which draws fluid from a tank 16 and the delivery end 12 of which is connected to a node A'. The node A' is furthermore connected in a fluid-conveying manner to the input end P of a 4/2-way valve 42, which forms a control valve. Moreover, the node A' is connected to the input end of a logic valve 44 designed in the usual manner and moreover, a fluid line is routed to the pressure-influencing device 22, again having the form of an orifice plate 24. The output end B of the logic valve 44 is connected to the hydraulic recirculation system 14, which terminates with the load end 18. Moreover, the logic valve 44 has a control port C, which, in conjunction with an energy accumulator D in the form of a compression spring, actuates the stepped control piston 46 of the logic valve 44 by means of its control pressure. Starting from the control port C, which in turn forms a node 47, a fluid line is routed to the valve connection end A and thus to an outlet of the control valve 42. Its further output or connection end B is routed to a blind port Z1 in a fluid-conveying manner.

Further, the node 47 of the control port C leads to a releasable check valve 50 via a junction Z2 of a valve block 48, wherein the port 3 of which releasable check valve acts as the unblocking input for the check valve 50. At its input end 1, the check valve 50 is connected to the orifice plate 24 in a fluid-conveying manner, and at its output end 2, a fluid line is routed to the tank end T or to the tank 16 via an assigned node 52. Furthermore, the junction 52 is extended to the input end of the control valve 42 designated by T.

Figure 2:
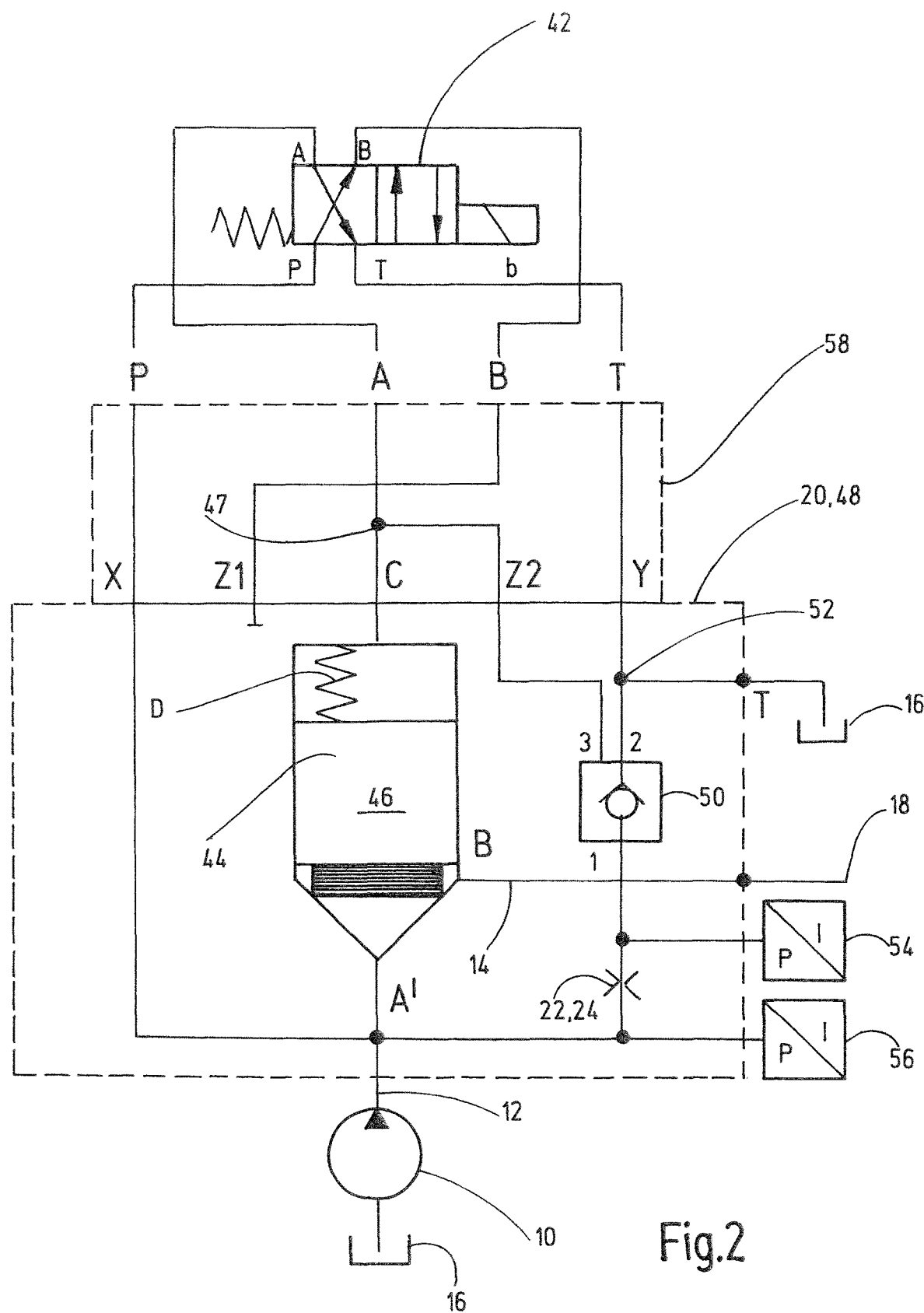
FIG. 2 shows a second exemplary embodiment.

In FIG. 2, the control valve 42 is shown in its spring-loaded initial position and assumes its right-hand switching position as viewed in the direction of FIG. 2, provided that the solenoid unit b is energized. Furthermore, pressure sensors 54, 56 are installed upstream and downstream of the orifice plate 24 in the circuit 14 leading thereto. In the block diagram 20, a cover 58 having the ports X, Y can be placed on the valve block 48. In this way, the solution according to FIG. 2 is a test device for volume flows of up to 1000 l/min and pressures of up to 500 bar. Higher application values are feasible. The block-like design of the valve block 48, the cover 58, the connectable control valve 42 and the connectable pressure sensors 54, 56 provides a modular structure that can be easily adapted to the conditions on machines of any type. In addition to the logic valve 44 and the control valve 42, the check valve 50 forms another control valve that is necessary for an appropriate operation of the test device.

In normal operation, the logic valve 44 is relieved of pressure with respect to the tank connection T or the tank 16, respectively, at the rear, provided the control valve 42 assumes its switching position shown in FIG. 2. If the pump device 10 is then in operation, its entire volume flow flows from the node A' to the hydraulic loads on the load end 18 via the output end B when the control piston 46 is open. During this process, the complete volume flow is directed to the power hydraulics via the logic valve 44, which is preferably designed as a cartridge solution.

For a measuring operation, on the other hand, the control valve or pilot valve 42 is switched to its right-hand position and the pump pressure of the pump device 10 reaches the rear of the control spool 46 of the valve 44 via the output end A of the valve 42 and via the control port C, resulting in the logic valve 44 closing and an interruption of the connection between node A' and output end B, respectively, aided by the compression spring energy accumulator D. Consequently, the control pressure existing in the control port C also pressurizes the control port 3 of the pilot-operated check valve 50 via the connection point Z2 and opens the latter. The complete volume flow originating from the pump device 10 then flows via the orifice plate 24, the input end 1 and the output end 2 of the check valve via the junction 52 to the tank port T or to the tank 16. In that case, the two sensors 54, 56 again detect the pressure drop at the orifice plate 24 and a test evaluation sequence is performed as described for the exemplary embodiment of FIG. 1.

The test equipment according to the invention can be used with virtually any hydraulic drive system. It is particularly recommended for drives whose unforeseen failure results in high consequential costs due to downtime, even though the hydraulic drive may only be supplying secondary functions, such as in machine tools, wind turbines or the lubricant supply of large turbines. In particular, the solution according to FIG. 2 permits a large number of adaptation options, because the valves 42 and 50 and the sensors 54, 56 can basically be left unchanged in their design and only the valve block 48 in conjunction with the assigned logic valve 44 has to be adapted volumetrically in terms of size, depending on the application. Overall, the test device according to the invention can be used to create a rapidly responsive monitoring system for the functionality of hydraulic pumping equipment. Accordingly, the evaluation device compares the detected pressure drop with a stored standard pressure drop and, if the pressure drop value is lower, deduces that the individual pump device is no longer fully functional.

The so-called pump condition monitoring unit (PCM) shown in FIG. 1 is provided as a mounting adapter between the hydraulic pump 10 and a hydraulic recirculation system 14. When the pump 10 is briefly decoupled from the system 14 after release, the PCM unit permits the performance of the pump 10 to be measured by switching the pump 10 to the orifice plates 22, 24. At the same pump speed and operating point of the pump 10, the pump condition can be "measured" by detecting the operating pressure. For this purpose, the so-called teach pressure measured when the pump 18 was new is compared to the currently detected pressure and the difference is evaluated. Taking into account a temperature correction, the current efficiency or the percentage wear of the pump 18 can be detected in this way. The "Teach" entry here stands for the process of "teaching" using the PCM unit.

The test mode is triggered via request by IOL or PLC and starts the automatic sequence. The PCM unit reports the status "Test running" via the status output. After the test has been completed, the result can be accepted as a teach value (reference) by issuing a command. To detect the temperature dependency depending on the pump type, oil type, etc., teaching at a different temperature hast to be performed close to the first teaching.

Depending on the test result and threshold value specification, the status results, which is output as a status display via an LED traffic light, binary coded via the status outputs and can be retrieved via IOL. The pressure value of the internal pressure transmitter (HPI-DMU) is output via 4 . . . 20 mA or 0 . . . 10V output.

In this respect, the PCM unit can be operated in two modes:
actuation via IO-Link, smart functions
actuation via PLC IOs, smart functions can be retrieved and configured via IOL-A.

The specifications via IOL or PLC are treated in the same way.

To be able to perform a temperature compensation as explained, two teach values are recorded, which are detected at different temperatures.

The second teaching has to be performed at a different temperature in the typical operating temperature range, and should preferably be performed only a few operating hours after the first teaching. The temperature behavior in the narrow temperature range is determined via the difference at approximately the same condition of the pump 10 and in that way compensated within appropriate limits during operation.

For instance, for a typical operating temperature range between 40 to 60° C., teaching should be performed at, say, 45° C. and 55° C., resulting in a teaching average of 50° C., which is stored as a reference value. Accordingly, two value pairs, which are stored, belong to the individual teaching. The test values in succession are then compensated with reference to the mean teach temperature.

The typical compensation factor is determined from these two measurements to allow compensation in the temperature range+/−15° C. around the determined teach temperatures.

The percentage wear V relative to the initial condition can then be determined as outlined below:
Based on the two value pairs from the teaching
Teach point 1: Pressure: PT1 (bar) at temperature: TT1 (K)
Teach point 2: Pressure: PT2 (bar) at temperature: TT2 (K)

the compensation factor komp is obtained $$comp=(PT1-PT2)/(TT1-TT2)\text{bar/K}$$

and the teach mean values for pressure and temperature $$PTM=(PT1+PT2)/2$$

$$TTM=(TT1+TT2)/2$$

If then a test is performed, this results in a pair of values for pressure and temperature
Pressure:PTest(bar)Temperature:TTest(K)
Using these two values, the percentage wear V of the pump can be determined as follows:
1. Calculate the compensated test pressure=test pressure at temperature TTM $$PTest(komp)=PTest-komp*(TTest-TTM)$$

2. Obtain the percentage wear V (%) of the pump from this value $$V=(PTM-PTest(komp))/PTM*100\%$$

As part of a plausibility check, to permit good detection accuracy of the pump condition, the test pressure in the new condition should be 70 to 85 percent flow of the maximum pump working pressure. The orifices 22, 24 selected in the block of FIG. 1 have to ensure this. In any case, the orifice pressure should be at a safe distance below the response pressure of the pressure relief function.

The invention claimed is:

1. A fluidic pump test device comprising:
a fluidic pump;
a pressure influencing device;
an evaluation device; and
a valve device,
wherein:
the fluidic pump is configured to be driven by a drive device;
the fluidic pump is configured such that a rotational speed of the fluidic pump, which leads to a fluid volumetric flow on an output side of the fluidic pump, is known;
the pressure influencing device is configured to: (i) conduct, at least temporarily, the fluid volumetric flow; and (ii) during operation of the fluidic pump, bring about a pressure drop;
the evaluation device is configured to, based on a decrease of the pressure drop, determine a reduction in a functional capability of the fluidic pump;
the valve device includes a first control valve;
the first control valve is a 3/2-way switching valve;
the first control valve is configured to be actuated by a second control valve; and
the second control valve is a 4/2-way switching valve.

2. The fluidic pump test device of claim 1, wherein:
the pressure influencing device includes an orifice plate; and
the evaluation device includes at least one pressure sensor.

3. The fluidic pump test device of claim 1, further comprising:
a supply circuit,
wherein:
an input end of the pressure influencing device is connected, at least temporarily, to a high-pressure end of the supply circuit; and
an output end of the pressure influencing device is connected to a low-pressure end of the supply circuit.

4. The fluidic pump test device of claim 1, further comprising:
a supply circuit,
wherein:
the valve device is between the pressure influencing device and a low-pressure end of the supply circuit; or
the valve device is, at least in part, a component of the pressure influencing device.

5. The fluidic pump test device of claim 1, further comprising:
a supply circuit,
wherein:
the valve device is between the pressure influencing device and a high-pressure end of the supply circuit; or
the valve device is, at least partially, a component of the pressure influencing device.

6. The fluidic pump test device of claim 2, further comprising:
a communication device,
wherein:
the evaluation device further includes a microcontroller;
the at least one pressure sensor is configured to detect pressure values and forward the pressure values to the microcontroller for processing;
the communication device defines an interface to a machine configured to be fluidically driven; and
the microcontroller is configured to send a signal to the machine upon the reduction in the functional capability of the fluidic pump.

7. The fluidic pump test device of claim 1, wherein:
the second control valve is configured to actuate a third control valve; or
the third control valve is a hydraulically releasable check valve.

8. The fluidic pump test device of claim 1, further comprising:
a supply circuit,
wherein:
the fluidic pump is configured to, in a first valve position of the valve device, supply a fluid to the supply circuit; and
the fluidic pump is configured to, in a second valve position of the valve device: (i) interrupt the supply of the fluid to the supply circuit; and (ii) supply a sensor section with the fluid, the sensor section including the pressure influencing device and opening out towards a low-pressure end of the supply circuit.

9. A method for operating the fluidic pump test device of claim 1, the method comprising:
determining, by the evaluation device, that when the pressure drop at the pressure influencing device is lower compared to an earlier pressure drop at the pressure influencing device, a delivery loss of the fluidic pump and the reduction in the functional capability of the fluidic pump has occurred.

10. The method of claim 9, further comprising:
comparing, by the evaluation device, measured pressure difference values to a normal value for assessing the functional capability of the fluid pump,
wherein:
the normal value is derived from experience as a factory specification or is determined and stored individually during commissioning; and
when a deviation from the normal value is determined to exceed a predeterminable threshold value, the fluidic pump is determined to be poor or functionally impaired or inoperable.

11. The method of claim 9, wherein:
the fluidic pump test device is operated exclusively in bypass mode in which: (i) a test measurement or a test of the fluidic pump is performed in a bypass branch when a main function of hydraulic loads is switched off; and (ii) a shutdown of the main function of hydraulic loads is signaled to the fluidic pump test device via an interface, thereby activating the test.

12. The fluidic pump test device of claim 3, wherein:
the high-pressure end of the supply circuit includes a fluid outlet of the fluidic pump; and
the low-pressure end of the supply circuit includes a tank.

13. The fluidic pump test device of claim 6, wherein the interface is an IO-Link interface.

* * * * *